United States Patent
Anderson

(10) Patent No.: US 9,956,881 B2
(45) Date of Patent: May 1, 2018

(54) HYBRID ELECTRIC DRIVE SYSTEM AND METHOD

(71) Applicant: Autonomous Tractor Corporation, St. Michael, MN (US)

(72) Inventor: Terry Anderson, Spearfish, SD (US)

(73) Assignee: Autonomous Tractor Corporation, St. Michael, MN (US)

( * ) Notice: Subject to any disclaimer, the term of this patent is extended or adjusted under 35 U.S.C. 154(b) by 0 days. days.

(21) Appl. No.: 14/915,599

(22) PCT Filed: Aug. 28, 2014

(86) PCT No.: PCT/US2014/053238
§ 371 (c)(1),
(2) Date: Feb. 29, 2016

(87) PCT Pub. No.: WO2015/031662
PCT Pub. Date: Mar. 5, 2015

(65) Prior Publication Data
US 2016/0214487 A1    Jul. 28, 2016

Related U.S. Application Data

(60) Provisional application No. 61/872,168, filed on Aug. 30, 2013.

(51) Int. Cl.
*B60K 31/06*    (2006.01)
*B60L 11/02*    (2006.01)
(Continued)

(52) U.S. Cl.
CPC ............... *B60L 11/02* (2013.01); *B60K 6/00* (2013.01); *B60K 6/40* (2013.01); *B60K 6/46* (2013.01);
(Continued)

(58) Field of Classification Search
CPC ...................................................... B60K 11/02
(Continued)

(56) References Cited

U.S. PATENT DOCUMENTS 3,719,881 A * 3/1973 Shibata .................... B60K 6/46
180/65.245
5,190,123 A * 3/1993 Hvolka .................. B60T 1/062
188/170

(Continued)

FOREIGN PATENT DOCUMENTS

WO    WO-2015031662 A1    3/2015

OTHER PUBLICATIONS

International Application Serial No. PCT/US2014/053238, International Preliminary Report on Patentability dated Mar. 10, 2016, 9 pgs.
(Continued)

*Primary Examiner* — Jeffrey J Restifo
(74) *Attorney, Agent, or Firm* — Schwegman Lundberg & Woessner, P.A.

(57) ABSTRACT

A hybrid drive system and associated methods are described that include an internal combustion engine, an electric motor, and a liquid cooling system. In one example, the liquid cooling system includes an oil circulation system that cools selected components, and lubricates selected components.

13 Claims, 3 Drawing Sheets

(51) Int. Cl.
| | |
|---|---|
| *B60K 11/02* | (2006.01) |
| *B60K 6/00* | (2006.01) |
| *B60K 6/46* | (2007.10) |
| *B60K 6/40* | (2007.10) |
| *B60K 11/04* | (2006.01) |
| *B60R 17/02* | (2006.01) |
| *B60T 11/10* | (2006.01) |
| *B62D 55/24* | (2006.01) |

(52) U.S. Cl.
CPC .............. *B60K 11/02* (2013.01); *B60K 11/04* (2013.01); *B60R 17/02* (2013.01); *B60T 11/10* (2013.01); *B62D 55/24* (2013.01); *Y02T 10/6217* (2013.01); *Y10S 903/951* (2013.01)

(58) Field of Classification Search
USPC .............................. 180/65.265, 65.275, 68.4
See application file for complete search history.

(56) References Cited

U.S. PATENT DOCUMENTS

| | | | | |
|---|---|---|---|---|
| 5,251,588 | A * | 10/1993 | Tsujii | B60K 6/46 123/142.5 E |
| 5,294,191 | A * | 3/1994 | Giorgetti | B60L 7/10 180/165 |
| 5,343,970 | A | 9/1994 | Severinsky | |
| 6,450,275 | B1 * | 9/2002 | Gabriel | B60K 6/22 165/41 |
| 8,742,701 | B2 * | 6/2014 | Sujan | F01P 3/20 123/41.09 |
| 8,781,658 | B2 * | 7/2014 | Simonini | B60L 1/003 180/65.1 |
| 8,806,882 | B2 * | 8/2014 | Bennion | B60H 1/00907 123/41.29 |
| 8,818,648 | B2 * | 8/2014 | Takanashi | E02F 9/2025 180/65.21 |
| 8,875,820 | B2 * | 11/2014 | Yamashita | E02F 9/2095 165/104.33 |
| 8,919,471 | B2 * | 12/2014 | Oberti | B60K 1/00 180/68.4 |
| 9,096,207 | B2 * | 8/2015 | Madurai Kumar | B60K 6/48 |
| 2001/0050191 | A1 * | 12/2001 | Ogawa | B60L 11/1874 180/65.225 |
| 2002/0040896 | A1 * | 4/2002 | Ap | B60K 1/04 219/208 |
| 2002/0073726 | A1 * | 6/2002 | Hasebe | B60K 1/02 62/323.1 |
| 2004/0036365 | A1 * | 2/2004 | Doherty | H02K 11/042 310/52 |
| 2004/0045749 | A1 * | 3/2004 | Jaura | B60K 6/22 180/65.26 |
| 2007/0145745 | A1 * | 6/2007 | Woods | F01P 3/00 290/1 A |
| 2009/0071156 | A1 * | 3/2009 | Nishikawa | F01K 13/02 60/660 |
| 2011/0214627 | A1 * | 9/2011 | Nishikawa | F01P 7/04 123/41.02 |
| 2011/0232592 | A1 * | 9/2011 | Taki | F02F 1/242 123/41.42 |
| 2012/0130576 | A1 * | 5/2012 | Sugiyama | B60K 6/12 701/22 |
| 2012/0143414 | A1 * | 6/2012 | Shin | B60K 11/02 701/22 |
| 2013/0014911 | A1 * | 1/2013 | Lee | B60W 20/00 165/51 |
| 2013/0299256 | A1 * | 11/2013 | Yamashita | E02F 9/2095 180/68.1 |
| 2014/0100731 | A1 * | 4/2014 | Ono | B60W 20/108 701/22 |
| 2015/0094893 | A1 * | 4/2015 | Hopkirk | F02D 29/02 701/22 |
| 2015/0273976 | A1 * | 10/2015 | Enomoto | B60K 6/22 165/202 |
| 2015/0315956 | A1 * | 11/2015 | Alm | F01P 7/165 123/41.08 |
| 2016/0032815 | A1 * | 2/2016 | Nguyen | B60K 6/22 180/65.275 |
| 2016/0107526 | A1 * | 4/2016 | Jin | B60L 7/10 307/10.1 |
| 2016/0153343 | A1 * | 6/2016 | Kakehashi | B60H 1/00885 123/41.31 |
| 2016/0339761 | A1 * | 11/2016 | Enomoto | B60H 1/06 |
| 2016/0339898 | A1 * | 11/2016 | Kamado | F01P 5/04 |
| 2017/0144532 | A1 * | 5/2017 | Tokozakura | B60K 11/02 |

OTHER PUBLICATIONS

International Application Serial No. PCT/US2014/053238, International Search Report dated Jan. 21, 2015, 4 pgs.
International Application Serial No. PCT/US2014/053238, Invitation to Pay Additional Fees and Partial Search Report dated Nov. 13, 2014, 2 pgs.
International Application Serial No. PCT/US2014/053238, Written Opinion dated Jan. 21, 2015, 7 pgs.

\* cited by examiner

HYBRID ELECTRIC DRIVE SYSTEM AND METHOD

CLAIM OF PRIORITY

This patent application is a U.S. National Stage Filing under 35 U.S.C. 371 from International Application No. PCT/US2014/053238, filed on Aug. 28, 2014, and published as WO 2015/031662 A1 on Mar. 5, 2015, which claims the benefit of priority of U.S. Provisional Patent Application Ser. No. 61/872,168, filed on Aug. 30, 2013, which are hereby incorporated by reference herein in their entireties.

TECHNICAL FIELD

Various embodiments described herein relate to apparatus, systems, and methods associated with hybrid electric vehicle drive systems.

BACKGROUND

Hybrid electric drive systems utilize an internal combustion engine to generate electricity and drive an electric motor. Such a configuration can be very energy efficient because the internal combustion engine can be run at a substantially constant speed to generate electricity. Additional configurations are constantly being sought to further improve efficiency.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1:
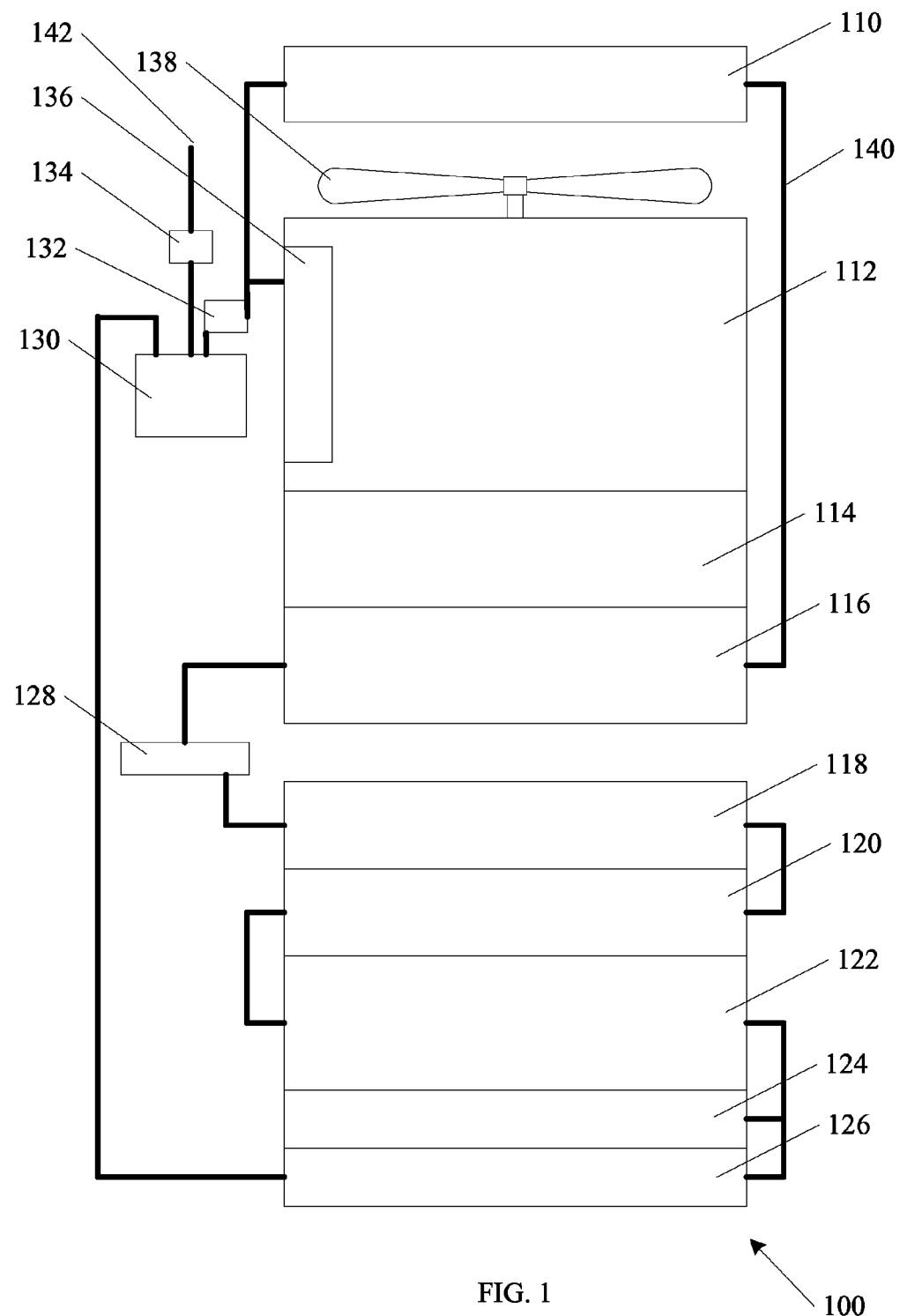
FIG. 1 shows a block diagram of a hybrid drive system according to an embodiment of the invention.

FIG. 1 shows a hybrid drive system 100. The hybrid drive system 100 includes an internal combustion engine 112 coupled to a generator 114. In one example, the internal combustion engine 112 is a diesel engine. In other examples, the internal combustion engine 112 is a gasoline engine. Although diesel and gasoline engines are used as an example, other fuels, such as ethanol, compressed natural gas, propane, hydrogen, etc. are within the scope of the invention.

In one example, the hybrid drive system 100 includes a rectifier 116 to convert alternating current from the generator 114 to direct current. In one example, a radiator 110 is coupled adjacent to a fan 138 to provide cooling of a liquid medium. In one example, a pair of radiators are coupled adjacent to one another, where one radiator includes standard engine coolant, such as ethylene glycol, and a second radiator includes a liquid medium as described in examples below. In one example, the fan 138 is used to cool both the ethylene glycol radiator and the liquid medium radiator. In one example the liquid medium includes a lubricant. In one example, the liquid medium includes an oil based medium.

FIG. 1 further shows an electric motor 122 to drive wheels of a vehicle. In one example, the vehicle includes an agricultural vehicle. In one example, the agricultural vehicle includes an autonomous tractor. In one example, the agricultural vehicle includes other autonomous agricultural implements such as a planter, combine, etc. Although an example vehicle shown in FIG. 2 includes an agricultural vehicle, the invention is not so limited. A hybrid drive system 100 as shown may be used in non-agricultural vehicles.

An electric motor 122 is further shown in FIG. 1. In one example, the electric motor 122 is electrically connected to an electric output of the generator 114 to provide hybrid electric drive power. The electric motor 122 is shown along with a number of additional components in block diagram form at the bottom of FIG. 1. An electric power regulation module 118 is shown, along with motor bearings 120, a brake system 124, and a gear box 126.

Although a number of systems are drawn adjacent to one another in block diagram form in FIG. 1 (such as the electric motor 122, electric power regulation module 118, motor bearings 120, brake system 124, and gear box 126), the systems are not required to be directly adjacent to one another. They are grouped together in FIG. 1 for illustration to show a unified cooling system as described in examples below.

A reservoir tank 130 is further shown in FIG. 1. In one example, the reservoir tank 130 includes an amount of a liquid medium as discussed above. In one example the liquid medium includes a lubricant. In one example, the liquid medium includes an oil based medium.

In the example of FIG. 1, a pump 136 is driven by the internal combustion engine 112 to pump the liquid medium through connection lines 140 to a number of components and/or systems in the hybrid drive system 100. In one example, a relief valve 132 is shown coupled between the pump 136 and the reservoir tank 130 to provide for overflow pressure within the system as driven by the pump 136.

In one example, the connection lines 140 flow the liquid medium through the radiator 110, and out to various components and/or systems of the hybrid drive system 100 that are cooled by a single supply of liquid medium as shown in FIG. 1. As discussed above, in one example, the liquid medium includes a lubricant such as oil. One advantage of cooling with a lubricant includes the ability to lubricate components and/or systems of the hybrid drive system 100 that require lubrication, and to cool components and/or systems of the hybrid drive system 100 that require cooling. Using a single supply of liquid medium makes the design of the hybrid drive system 100 simple and reliable by reducing a number of necessary components, and eliminating the need for both a lubrication system and a cooling system.

Although an example flow pathway for the liquid medium is illustrated in FIG. 1, one of ordinary skill in the art, having the benefit of the present disclosure, will recognize that other flow pathways are possible. Other orders of which components and/or systems come first in the supply flow are within the scope of the invention.

In the example of FIG. 1, the liquid medium flows from the radiator 110 through the rectifier 116, then through the electric power regulation module 118, to the motor bearings 120, through the electric motor 122 itself, to the brake system 124, and to the gear box 126. After the liquid medium passes through all desired components and/or systems, the liquid medium is directed back to the reservoir 130.

Although for illustration purposes, the flow of the liquid medium is shown in series from one component and/or system, the invention is not so limited. In one example, a flow divider 128 is shown. In one example, flow of the liquid medium may be directed in parallel from the flow divider 128 to various components and/or systems at selected flow rates.

FIG. 1 further illustrates a pneumatic pressure source 142 that may be coupled to the hybrid drive system 100 in selected embodiments. A valve 134 such as a solenoid or other suitable valve is shown to regulate pneumatic pressure in the reservoir 130. By pressurizing the reservoir 130, the entire system of liquid medium may be pressurized. In one example, a pneumatically pressurized flow system of liquid medium is used to provide a safety feature for an autonomous vehicle.

In one example, the brake system 124 is configured to be normally biased in a stopping or braking condition. Examples of a braking condition include a mechanical spring or other device that biases brake pads against a drum or disk or other friction surface. When the hybrid drive system 100 is not in operation, the brake system 124 is engaged, and the associated vehicle cannot move.

In one example, the connection line 140 coupled to the brake system 124 provides a supply of pressurized liquid medium wherein the pressure in the system is supplied by the pneumatic pressure source 142. In one example, the pressurized liquid medium is coupled to the brake system 124 to overcome the normally biased condition, and allow the associated vehicle to move. If power is lost at any time during operation of the hybrid drive system 100, the brake system 124 will lose pressure from the connection line 140 and the brake system will return to the biased condition and stop the vehicle. Safety of the vehicle is increased because the vehicle will stop without any intervention from an operator whenever the hybrid drive system 100 loses power. This feature may be particularly advantageous in an autonomous vehicle.

Figure 2:
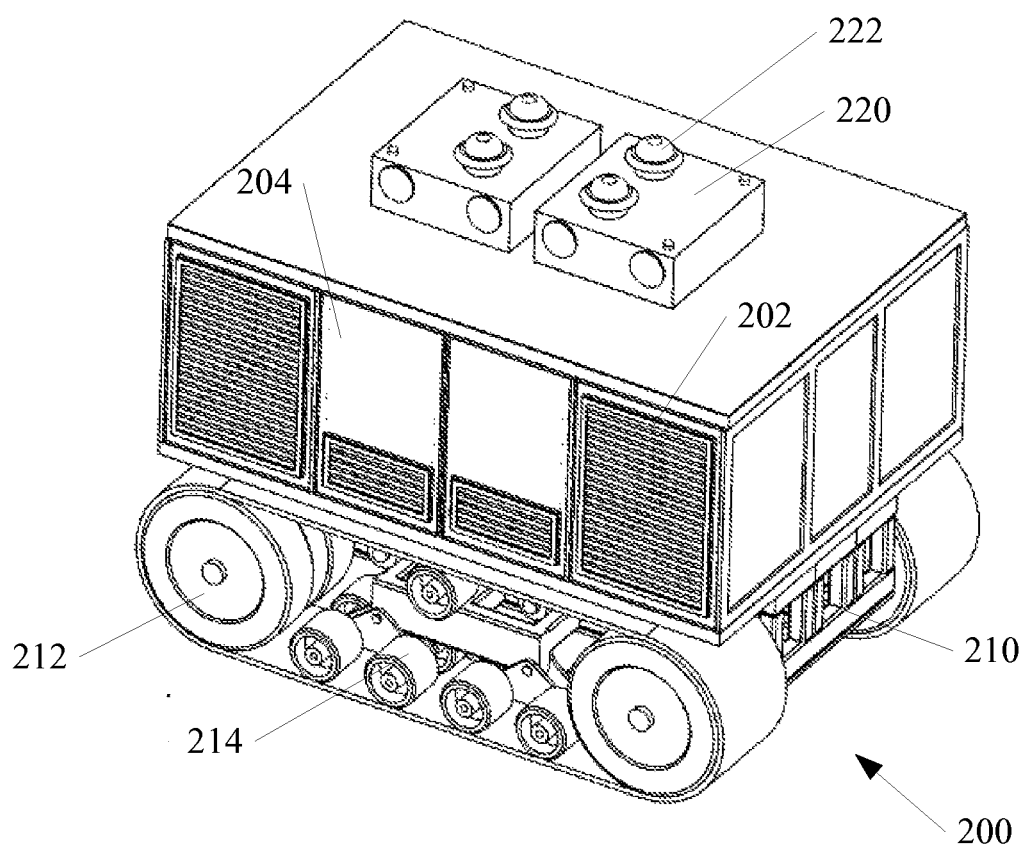
FIG. 2 shows an isometric view of a hybrid electric vehicle according to an embodiment of the invention.

FIG. 2 shows an example vehicle 200 that may be used with embodiments of the hybrid drive system 100 described above. In one example, the vehicle 200 is configured to operate as an agricultural vehicle, such as a tractor. The vehicle 200 includes a vehicle 210, and a first diesel electric power supply 202 coupled to the vehicle frame 210. In one example, the vehicle 200 further includes a second diesel electric power supply 204 coupled to the vehicle frame 210. The use of two power supplies provides a level of redundancy and ease of repair. In the example shown, the vehicle 200 includes drive wheels 212 and a pair of track belts 214 running over the drive wheels 212. In one example, the drive wheels 212 each include an electric motor drive mounted substantially within a hub of the drive wheel 212 that is powered by one or more of the diesel electric power supplies 202, 204. In one example, all four drive wheels 212 include an electric motor.

The vehicle 200 of FIG. 2 shows a mobile positioning system 220, similar to the mobile positioning system 200 described in examples above. A pair of lasers 222 are shown, as part of a laser positioning system similar to the system described in embodiments above. In one example, the mobile positioning system 220 further includes an RF positioning system located internal to the enclosure of mobile positioning system 220.

Figure 3:
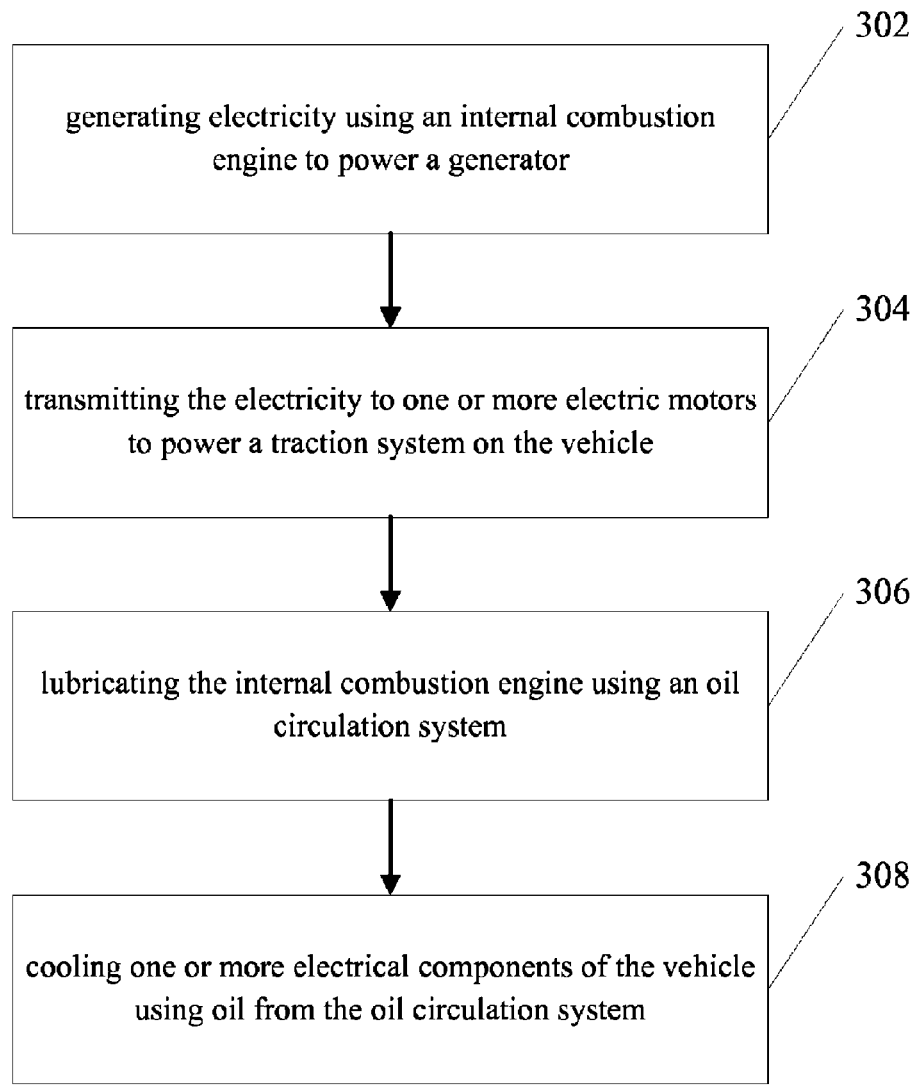
FIG. 3 shows a flow diagram of a method of operation of a vehicle according to an embodiment of the invention.

FIG. 3 shows an example method of operating a hybrid electric drive system according to an embodiment of the invention. In operation 302, electricity is generated using an internal combustion engine to power a generator. In operation 304, the electricity is transmitted to one or more electric motors to power a traction system on the vehicle. In operation 306, the internal combustion engine is lubricated using an oil circulation system. In operation 308, one or more electrical components of the vehicle are cooled using oil from the oil circulation system.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A hybrid drive system, comprising:
    an internal combustion engine;
    at least one electric motor;
    an electric generator mechanically coupled to the internal combustion engine, and electrically coupled to the electric motor;
    electronics to control the drive system;
    a pressurized liquid circulation system, coupled to the internal combustion engine, the electric motor, and the electronics; and
    an emergency brake system coupled to the pressurized liquid circulation system, wherein one or more brakes are released only when pressure is maintained in the pressurized liquid circulation system.

2. The hybrid drive system of claim 1, wherein the liquid circulation system includes an oil circulation system.

3. The hybrid drive system of claim 2, wherein the oil circulation system is coupled to cool a rectifier in the generator.

4. The hybrid drive system of claim 3, wherein the oil circulation system is coupled in series to the internal combustion engine, the rectifier, the electronics, the electric motor, and the gear box.

5. The hybrid drive system of claim 1, further including a gear box coupled between the electric motor and one or more drive wheels.

6. The hybrid drive system of claim 1, wherein the oil circulation system includes a first radiator, and the internal combustion engine includes a second radiator, and further including a single fan configured to blow across both the first and second radiator.

7. The hybrid drive system of claim 1, wherein the internal combustion engine includes a diesel engine.

8. An autonomous vehicle, comprising:
    an internal combustion engine;
    at least one electric motor;
    an electric generator mechanically coupled to the internal combustion engine, and electrically coupled to the electric motor;
    a number of drive wheels mounted to the frame, and electrically coupled to the electric motor;
    a pressurized oil circulation system, coupled to the internal combustion engine, and the electric motor; and an emergency brake system coupled to the pressurized oil circulation system, wherein one or more brakes in the number of drive wheels are released only when pressure is maintained in the pressurized oil circulation system.

9. The autonomous vehicle of claim 8, wherein the pressurized oil circulation system is further coupled to cool drive system electronics.

10. The autonomous vehicle of claim 9, wherein the pressurized oil circulation system is further coupled to cool a rectifier in the electric generator.

11. The autonomous vehicle of claim 8, wherein the pressurized oil circulation system includes a first radiator, and the internal combustion engine includes a second radiator, and further including a single fan configured to blow across both the first and second radiator.

12. The autonomous vehicle of claim 8, further including a pair of track belts running over the drive wheels on sides of the vehicle frame.

13. The autonomous vehicle of claim 8, wherein the internal combustion engine further includes a pair of diesel engines.

* * * * *